United States Patent [19]

Bencini

[11] 4,076,109
[45] Feb. 28, 1978

[54] DUAL FRICTION CLUTCH FOR MOTION-PICTURE PROJECTORS

[76] Inventor: Roberto Bencini, Dr.Ing. Misitano A.G. via Padova, 217, 20127 Milan, Italy

[21] Appl. No.: 610,789

[22] Filed: Sep. 5, 1975

[30] Foreign Application Priority Data

Sep. 25, 1974 Italy ................................ 27672/74

[51] Int. Cl.$^2$ .................... F16D 47/00; F16D 7/02
[52] U.S. Cl. .................... 192/48.4; 192/48.5; 192/93 R; 64/30 R; 64/30 C
[58] Field of Search .............. 192/48.4, 48.5, 53 B, 192/93 R; 64/30 R, 30 C

[56] References Cited

U.S. PATENT DOCUMENTS

| 1,935,454 | 11/1933 | Lansing | 192/48.5 X |
| 2,092,447 | 9/1937 | Fleischel | 192/48.5 X |
| 2,521,427 | 9/1950 | Victor | 64/30 R X |
| 2,675,835 | 4/1954 | Kiekhaefer | 192/48.5 X |
| 2,709,349 | 5/1955 | Kuehn | 64/30 R |
| 2,913,885 | 11/1959 | Debrie | 64/30 C |

Primary Examiner—Allan D. Herrmann

[57] ABSTRACT

The disclosure describes a dual friction clutch, of particular application to motion picture projectors for controlling the operation of spool carrying spindles, in which the drive to a spool can be selectively decoupled, coupled through a weak clutch and coupled through a relatively strong clutch mounted at opposite ends of the spindle, by displacement of a selector device displaceable parallel to the spindle axis to any one of three positions in the first of which the drive is decoupled from the spool, in the second of which the selector connects to the spool through a weak friction clutch and a third position in which the selector transmits the drive to the spool through the strong friction clutch with the weak friction clutch positively locked.

7 Claims, 5 Drawing Figures

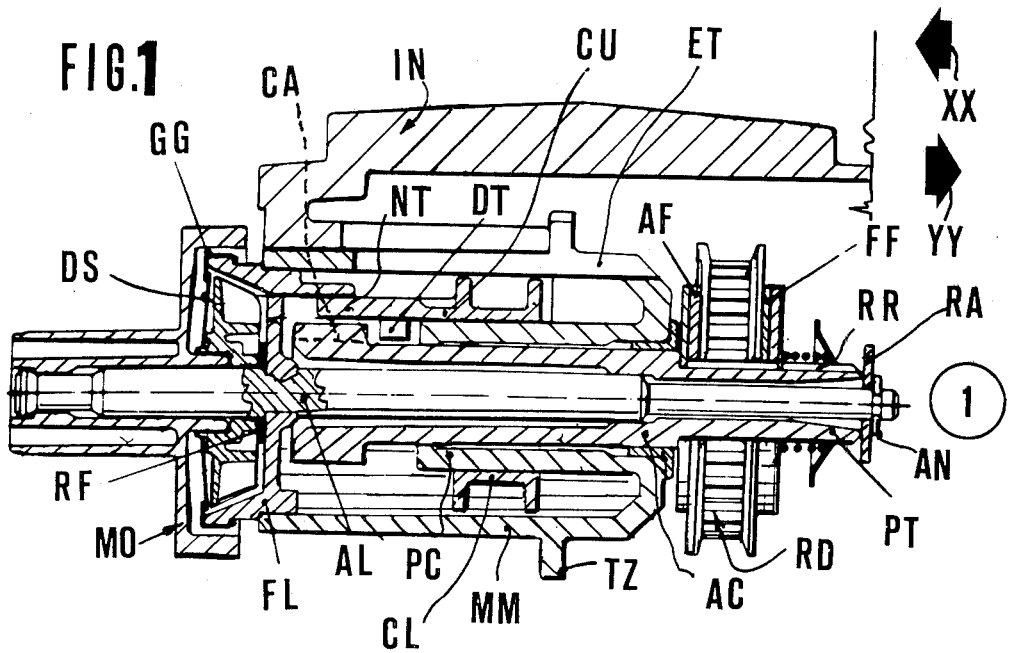
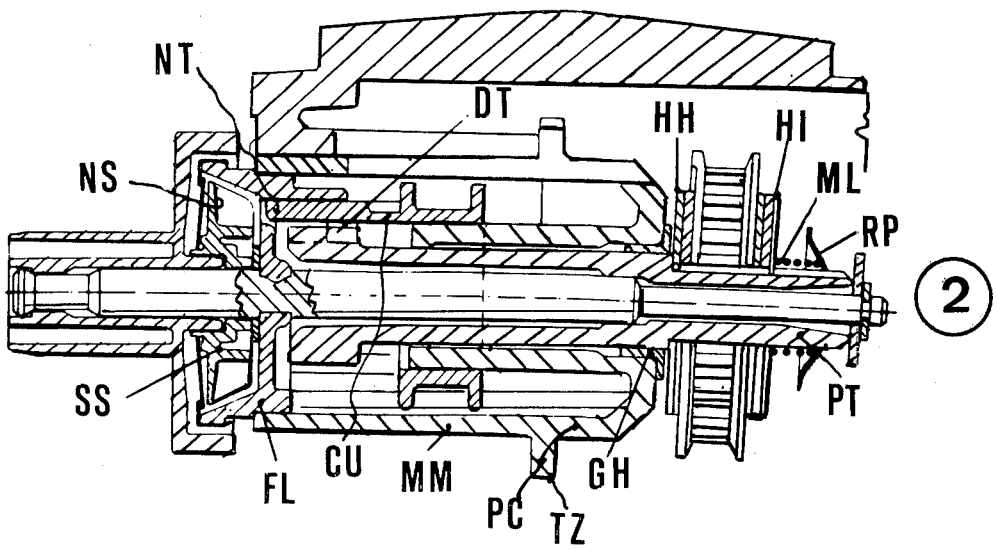

DUAL FRICTION CLUTCH FOR MOTION-PICTURE PROJECTORS

BACKGROUND OF THE INVENTION

This invention relates to improvements in friction clutches having dual or multiple functions such as are required, for example, in motion-picture projectors.

It is an object of the present invention to provide a dual friction clutch capable of performing the dual functions required in conventional motion-picture projectors of the kind provided with two parallel spindles, each carrying a film-spool to be wound or unwound.

DESCRIPTION OF THE PRIOR ART

Dual or multiple friction clutches are essentially required because during the different operative stages the said spindles have to be free, or controlled by a weak friction clutch or controlled by a strong friction clutch.

SUMMARY OF THE INVENTION

This invention provides a dual friction clutch that satisfies the above requirements by a simple way and which makes possible the simultaneous control of both spindles by means of a rotatable double cam operated by the operator.

According to the present invention there is provided a dual friction clutch for motion-picture projectors comprising spindle means for carrying a film spool, a stationary frame, a hollow spindle coaxial about the spindle means, a stationary sleeve having an inside tubular section and an outside tubular section, the outside tubular section being fixed to the stationary frame and a toothed drive wheel mounted around said hollow spindle, a weak friction clutch and a strong friction clutch mounted coaxially on said spindle means at opposite ends thereof and a selector device comprising a slider rotatably mounted about the said inside section of the tubular sleeve and movable parallel to the axis of said spindle means between a first position wherein both clutches are unclutched, a second position wherein the spindle means is subject only to the weak friction clutch, and a third position wherein the spindle means is subject to the strong friction clutch.

Further objects and advantages of the invention will appear from the following detailed description of one embodiment thereof and from the accompanying drawings.

BRIEF DESCRIPTION OF THE DRAWINGS

In the drawings:

FIG. 1 is a longitudinal axial sectional view of a dual friction clutch according to this invention;

FIG. 2 and FIG. 3 are two representations similar to FIG. 1, showing the location of the different components when the weak friction clutch and the strong friction clutch are respectively actuated.

DETAILED DESCRIPTION OF THE INVENTION

The description for grounds of clarity and consistency will follow under the following eight headings:
I. General disposition
II. Weak friction clutch
III. Strong friction clutch
IV. Selection device
V. Unclutching of the film spool carrying spindle
VI. Weak friction clutch operation
VII. Strong friction clutch operation
VIII. Application of the dual friction in a conventional motion-picture projector

I. GENERAL DISPOSITION

Figure 4:
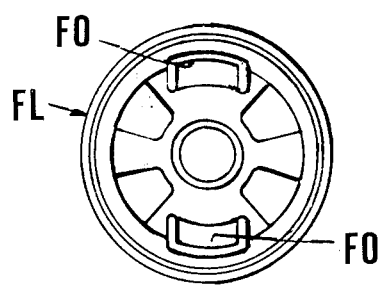
FIG. 4 is an upright elevational view of the flange of plastics material moulded in a circular groove of the spool carrying spindle.

A spindle AL controlling a hub MO carrying a film spool (not shown) in rigidly fixed to a flange FL which is preferably made of plastics material and is moulded in a groove of the spindle AL. The flange FL presents two diametrically opposed holes FO (FIG. 4) the operation of which will be described below.

A friction washer RF abuts against the flange FL and cooperates with a crown-profiled disc or presser SS made of plastics material.

The spindle AL is prevented from an axial movement as follows: the flange FL abuts against a stationary double sleeve comprising an external section MM and an internal section PC, the external section MM being connected by two lugs TZ to the stationary projector frame IN. The right end (FIG. 1) of the spindle AL abuts by means of a stop washer AN and an annular washer RA against the adjacent portion PT of a hollow spindle AC, the latter housing the spindle AL. Since the hollow spindle AC abuts against the stationary sleeve MM-PC by means of the ring nut GH any axial movement in the direction of the arrow XX is prevented. The terminal portion PT of the hollow spindle AC presents a longitudinal groove RR and freely receives a toothed drive wheel RD; adjacent to one side of the wheel RD an annular friction disc AF is mounted and a annular friction disc FF is similarly mounted on the opposite side. Two annular washers HH and HI cooperate with the groove RR and operate as pressure components for the friction discs AF-FF respectively. The pressure component HH abuts against the ring nut GH fixed to the internal sleeve PC that houses the hollow spindle AC.

The drive wheel RD drives the hollow spindle AC through the strong friction clutch provided by the friction discs AF and FF and the annular washers HH and HI keyed into the groove RR.

II. WEAK FRICTION CLUTCH

A thin cup spring DS made of steel is clamped by its marginal edge to the flange FL by means of a metal ring GG. The elastic reaction of the cup spring DS is transmitted to the presser disc SS and by the latter to a friction washer RF mounted between the flange FL and the presser disc SS. The hub MO and the presser disc SS are coupled to one another by means of a frontal teeth joint of a conventional design.

III. STRONG FRICTION CLUTCH

This strong friction clutch consists of the above mentioned annular friction discs AF-FF cooperating respectively with the two faces of the drive wheel RD and the pressure annular washers HH-HI as above explained. The pressure on the friction discs is caused by a relatively strong cylindrical spring ML cooperating with a pressure adjustment washer RP. The pressure annular component HH is pressed against the intermediate ring nut GH fixed to the internal stationary sleeve PC. The clutch is relatively strong since the tension of the spring ML is relatively higher than that of cup spring DS.

IV. SELECTION DEVICE

Figure 3:
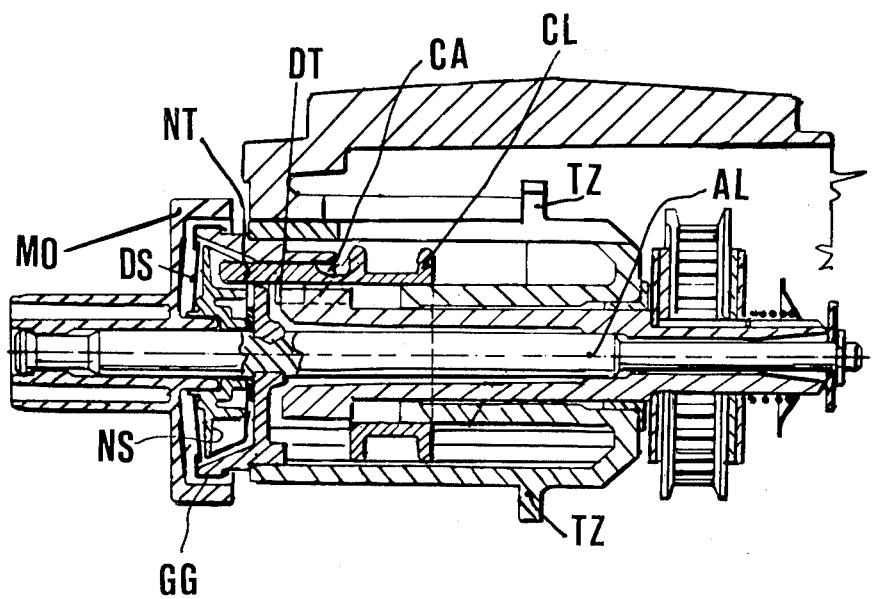

The hollow spindle AC is formed with a lateral groove CA able to cooperate with a radial tooth DT which is mould formed on a selection operating slider CU which is slidable along the internal sleeve PC. A collar CL is moulded on the slider CU to be engaged by a control lever (WW resp. BB) (compare the FIG. 5). As will be understood hereinafter, such a control lever operates to shift the slider according to the arrows XX—YY. The free ends ZZ-GS of the said control lever WW (resp. BB) slide along a slot ET formed in the external sleeve MM so as to engage the circular groove of the collar CL. The slider CU is formed with at least one further tooth NT (in this embodiment with two teeth) engaging a corresponding hole FO moulded in the flange FL (see FIG. 4). As will later be apparent, in the position shown in FIG. 3, each tooth NT engages a complementary profiled cavity NS formed in the annular presser SS. On the contrary, in the position shown in FIG. 1, the tooth DT and the teeth NT do not cooperate with the flange or with the presser SS.

Shifting of the slider CU according to the arrows XX resp. YY by means of the said control lever will cause the operative positions according to the FIGS. 1, 2 and 3 (respectively positions 1, 2, 3).

V. UNCLUTCHING OF THE FILM SPOOL CARRYING SPINDLE

In this position of the dual friction clutch (see position 1 — FIG. 1) the rotation of the drive toothed wheel RD can cause no rotation of the spool carrying hub MO since the slider radial tooth DT does not engage the complementarily profiled groove CA of the terminal left side portion of the hollow spindle AC, whereby no rotation can be imparted from the spindle AC to the slider CU and to the spindle AL.

VI. WEAK FRICTION CLUTCH OPERATION

If the slider CU is shifted to the left by one step (position 2 — FIG. 2), the tooth DT engages the complementary profiled groove CA of hollow spindle AC whereby a positive coupling is established between the hollow spindle AC and the slider CU. In the same time each tooth NT engages the holes FO of the flange FL whereby the flange FL and the connected spindle AL are rotated. The rotative torque impressed on the hub MO by means of the spindle AL is proportioned, as will be apparent, by the weak friction clutch. If a rotative movement is imparted to the wheel RD and the spool carrying hub MO is maintained stationary, the rotative torque transmitted to the hub MO will depend only on the relatively weak friction force impressed by the cup spring DS on to the presser disc SS through the friction washer RF.

VII. STRONG FRICTION CLUTCH OPERATION

If the slider CU is shifted by a further step to the left each tooth NT will engage a corresponding cavity NS of the complementary profile of the presser SS whereby the strong friction clutching is caused. From FIG. 3, (Position 3), it is apparent that the torsion torque impressed on the spindle AL will depend only on the strong friction clutch; effectively the slider CU is positively coupled to the hollow spindle AC by means of the radial tooth DT, and to the presser SS by means of each tooth NT as already explained. The rotational couple imparted to the presser SS and therefore to the spindle AL will depend substantially upon the degree of friction generated by the friction discs AF-FF by means of the spring ML.

The friction clutch of the present invention has so far been described in relation to a single spindle AL and it will be apparent that in addition to uncoupling the drive from the spindle AL it can also provide both a weak or a strong clutching condition according to requirements, the control being exercised by the position of the slider CU which in turn is axially displaced by the free end ZZ of the lever WW or the free end GS of the lever BB (FIG. 5) engaging in the circular groove of the collar CL. These levers WW and BB are respectively pivoted at OO and OQ to the projector frame IN.

Figure 5:
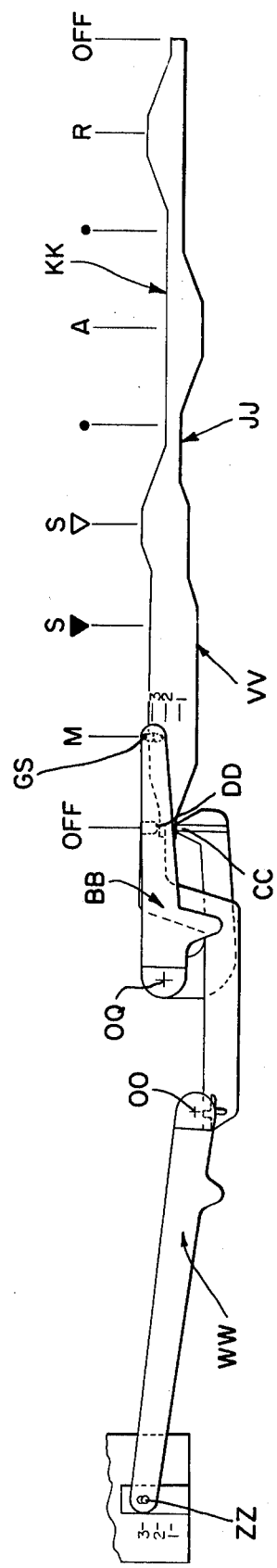
FIG. 5 is a schematic illustration showing the cam in its linear development and the two control levers freely pivoted and actuated by the double cam to be rotated by the operator.

In practice, a film projector has two such spindles which in the following table are identified as spindle I and spindle II and each would have a separate friction clutch such as that described above. These spindles have different clutching requirements in accordance with the direction in which the film is being wound at any given time. It is convenient to be able to impose these different requirements on the two spindles by a single control and one such control is schematically illustrated in FIG. 5. It comprises a double faced cam VV, the two profiles KK and JJ of which are shown in developed form, the profile JJ controlling the lever WW by its end CC and the profile KK controlling the lever BB by its end DD. Rotation of the cam VV simultaneously controls the position of the respective levers WW and BB and hence the operating state of the respective clutches. Each clutch provides three conditions for its associated spindle, the first condition (1) being that in which the spindle is free, the second condition (2) being that in which the spindle is weakly clutched and the third condition (3) being that in which the spindle is strongly clutched. These conditions can be selectively imparted to the spindles I and II by rotation of the cam VV by the operator as is illustrated in the following table together with FIG. 5, cam profile JJ controlling spindle I and cam profile KK controlling spindle II.

| CLUTCH ACTUATION (1, 2, 3) | | RUNNING | | CAME PROFILE REFERENCE (FIG. 5) |
|---|---|---|---|---|
| I Spindle | II Spindle | I Spindle | II Spindle | |
| (3) | (3) | locking-strong clutching | locking-strong clutching | OFF |
| (2) | (1) | forward running-weak clutching - film picking | release | M |
| (2) | (1) | forward running-weak clutching | release | S ∇ |
| (1) | (2) | (normal rearward running) | | |

-continued

| CLUTCH ACTUATION (1, 2, 3) | | RUNNING | | CAME PROFILE REFERENCE (FIG. 5) |
|---|---|---|---|---|
| I Spindle | II Spindle | I Spindle | II Spindle | |
| (3) | (3) | unlocking stop - strong clutching (speedy forward running) | weak clutching strong clutching (stop) | S Δ ° |
| (3) | (1) | strong clutching stop - strong clutching | unlocking strong clutching (stop) | A ° |
| (3) | (3) | | | |
| (1) | (3) | weak clutching - speedy rearward running | strong clutching | R |

What is claimed is:

1. A dual friction clutch for motion-picture projectors comprising spindle means for carrying a film spool, a stationary frame, a hollow spindle coaxial about the spindle means, a stationary sleeve having an inside tubular section and an outside tubular section, the outside tubular section being fixed to the stationary frame and a toothed drive wheel mounted around said hollow spindle, a weak friction clutch and a strong friction clutch mounted coaxially on said spindle means at opposite ends thereof and a selector device comprising a slider rotatably mounted about the said inside section of the tubular sleeve and movable parallel to the axis of said spindle means between a first position wherein both clutches are unclutched, a second position wherein the spindle means is subject only to the weak friction clutch and a third position wherein the spindle means is subject to the strong friction clutch.

2. A dual friction clutch according to claim 1 wherein said weak friction clutch comprises a ring presser disc concentric with said spindle means, a flange fixed to the spindle means, and a cup spring fixed to the said flange and urging the said ring presser disc against the said flange, the presser disc being formed with at least one cavity and the said flange being formed with at least one through hole.

3. A dual friction clutch according to claim 1 wherein said strong friction clutch comprises a set of friction discs cooperating with the opposite faces of said drive-toothed wheel, a relatively strong cylindrical spring pressing the said friction discs against said faces of said drive toothed wheel.

4. A dual friction clutch according to claim 2 wherein the said slider is formed with a collar moulded with a circular groove, control means is provided to axially move said slider between a release position of the said clutches, a weak friction clutch position and a strong clutch position, a radial and an axial tooth formed on the said slider, a groove formed in said hollow spindle and of a profile complementary to said radial tooth in the said release position neither the radial nor the axial teeth cooperating with the said hole and said cavity, in the said weak friction clutch position the said radial tooth cooperating with said groove, and in the said strong friction clutch position the said radial tooth cooperating with the said groove and the said axial tooth cooperating with the said cavity.

5. A dual friction clutch according to claim 4 wherein the control means comprises a pivotally mounted lever engaged in said grooved collar and operable selectively to displace said collar to said clutch positions.

6. A pair of dual friction clutches according to claim 5 in combination with a cam, a first profile on said cam and engaged with said lever of one of said pair of dual friction clutches to control the displacement of said collar thereof and a second profile on said cam engaged with said lever of the second of said pair of dual friction clutches to control the displacement of said collar thereof whereby the operation of said pair of dual friction clutches is controlled by rotation of said cam in a predetermined sequence.

7. A dual friction clutch for a motion picture projector comprising spindle means for carrying a film spool, mounting means on said spindle means for said film spool, a hollow spindle coaxially rotatable about said spindle means, a stationary sleeve having an inner tubular section coaxially disposed about said hollow spindle and an outer tubular section, a toothed drive wheel mounted about said hollow spindle, a strong friction clutch device interposed between said drive wheel and said hollow spindle and operable to transmit drive from such drive wheel to said hollow spindle, a weak friction clutch device interposed between said spindle means and said mounting means operable to transmit drive from said spindle means to said mounting means and a slider device rotatably mounted about said inner tubular section and displaceable axially with respect thereto and cooperating means on said slider operable upon displacement of said slider from a nonoperative position in which the slider is freely rotatable about said hollow spindle to a first operative position to engage said hollow spindle and said spindle means and transmit drive therebetween and operable upon further displacement of said slider additionally to engage said mounting means to transmit drive directly thereto.

* * * * *